United States Patent
Lindoff et al.

(10) Patent No.: US 10,004,085 B2
(45) Date of Patent: Jun. 19, 2018

(54) SCHEDULING FOR HETEROGENEOUS NETWORKS

(71) Applicant: Telefonaktiebolaget LM Ericsson (publ), Stockholm (SE)

(72) Inventors: Bengt Lindoff, Bjarred (SE); Bo Hagerman, Tyreso (SE); Fredrik Nordstrom, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 95 days.

(21) Appl. No.: 15/112,982

(22) PCT Filed: Jan. 21, 2014

(86) PCT No.: PCT/EP2014/051083
§ 371 (c)(1),
(2) Date: Jul. 20, 2016

(87) PCT Pub. No.: WO2015/110140
PCT Pub. Date: Jul. 30, 2015

(65) Prior Publication Data
US 2017/0006623 A1   Jan. 5, 2017

(51) Int. Cl.
*H04W 4/00* (2018.01)
*H04W 72/12* (2009.01)
*H04W 72/08* (2009.01)

(52) U.S. Cl.
CPC ..... *H04W 72/1231* (2013.01); *H04W 72/082* (2013.01); *H04W 72/1215* (2013.01)

(58) Field of Classification Search
CPC ......... H04W 72/1231; H04W 72/1215; H04W 72/082
(Continued)

(56) References Cited

U.S. PATENT DOCUMENTS

| 2012/0003981 A1 | 1/2012 | Krishnamurthy et al. |
| 2012/0087261 A1 | 4/2012 | Yoo et al. |

(Continued)

FOREIGN PATENT DOCUMENTS

| EP | 2603030 A1 | 6/2013 |
| JP | WO2013008794 A1 | 1/2013 |

(Continued)

OTHER PUBLICATIONS

PCT International Search Report, dated Nov. 13, 2014, in connection with International Application No. PCT/EP2014/051083, all pages.

(Continued)

*Primary Examiner* — Faisal Choudhury
(74) *Attorney, Agent, or Firm* — Sage Patent Group (57) ABSTRACT

A method is disclosed of a first network node of a cellular communication network comprising at least the first and a second network node. The first network node is adapted to transmit a first, desired, signal over a first frequency region using a first radio access technology, and the second network node is adapted to transmit a second, interfering, signal over a second frequency region using a second radio access technology. The first radio access technology is a single radio frequency carrier radio access technology. The first frequency region is partitioned into two or more sub-regions and the second frequency region is one of the sub-regions of the first frequency region. The method comprises determining that a wireless communication device residing in a cell served by the first network node is interfered by the second signal during signal reception over the first frequency region, and sending a first configuration message to the wireless communication device, wherein the first configuration message is adapted to cause the wireless communication device to report separate channel quality indicator (Continued)

values for each of the two or more sub-regions. The method also comprises receiving a channel quality indicator report indicative of the separate channel quality indicator values, and scheduling transmission of the first signal to the wireless communication device in one or more of the two or more sub-regions based on the received channel quality indicator report. Corresponding computer program product, arrangements and network node are also disclosed.

13 Claims, 3 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2012/0093010 | A1* | 4/2012 | Vajapeyam | H04L 1/0026 370/252 |
| 2012/0165029 | A1* | 6/2012 | Lindbom | H04L 5/00 455/450 |
| 2013/0109384 | A1 | 5/2013 | Abe et al. | |
| 2013/0150060 | A1 | 6/2013 | Abe et al. | |
| 2013/0157660 | A1* | 6/2013 | Awad | H04W 72/046 455/435.1 |
| 2013/0324140 | A1* | 12/2013 | Kwon | H04B 7/0626 455/450 |
| 2014/0056156 | A1* | 2/2014 | Jongren | H04L 1/0026 370/252 |
| 2014/0313912 | A1* | 10/2014 | Jongren | H04W 24/10 370/252 |
| 2014/0314047 | A1* | 10/2014 | Kalhan | H04W 36/0072 370/331 |
| 2015/0146638 | A1* | 5/2015 | Ohwatari | H04W 52/143 370/329 |

FOREIGN PATENT DOCUMENTS

| | | |
|---|---|---|
| TW | 201301812 A | 1/2013 |
| WO | 2010144729 A2 | 12/2010 |
| WO | 2011057037 A2 | 5/2011 |
| WO | 2011130453 A1 | 10/2011 |
| WO | 2011162395 A1 | 12/2011 |
| WO | 2013185854 A1 | 12/2013 |
| WO | 2015110141 A1 | 7/2015 |

OTHER PUBLICATIONS

PCT Written Opinion, dated Nov. 13, 2014, in connection with International Application No. PCT/EP2014/051083, all pages.
Wang et al., Enhanced Dynamic Inter-cell Interference CoordinationSchemes for LTE-Advanced, Vehicular Technology Conference, 2012 IEEE 75th, May 6, 2012, pp. 1-6.
PCT International Search Report, dated Nov. 13, 2014, in connection with International Application No. PCT/2014/051085, all pages.
PCT Written Opinion, dated Nov. 13, 2014, in connection with International Application No. PCT/2014/051085, all pages.
Lopez-Perez et al., Enhanced Intercell Interference Coordination Challenges in Heterogeneous Networks, IEEE Wireless Communications, IEEE Service Center, Piscataway, NJ, US, vol. 18, No. 3, Jun. 1, 2011, pp. 22-30.
3GPP TR 36.866 V1.1.0 (Nov. 2013), 3rd Generation Partnership Project; Technical Specification Group Radio Access Network; Network-Assisted Interference Cancellation and Suppression for LTE (Release 12), 59 pages.

* cited by examiner

SCHEDULING FOR HETEROGENEOUS NETWORKS

TECHNICAL FIELD

The present invention relates generally to the field of scheduling in wireless communication networks. More particularly, it relates to scheduling suitable for heterogeneous networks.

BACKGROUND

In a typical deployment of a cellular wireless communication network there may be a large variation of required spatial distribution of service coverage and capacity.

Mobility is a basic feature of cellular networks and basic coverage of service is required (almost) everywhere, which is typically achieved by application of a layer of macro cells supported by wide area coverage base station sites.

Suburban and urban areas may require high data throughput and/or accommodation of a large number of users (particularly so in densely populated areas, busy office areas, malls, sports arenas and the like) while rural areas may not. One deployment solution to handle this diversity situation is to introduce one or more layers (not necessarily contiguous) of low power, small coverage cells underlying the macro cell layer. The underlying cells are typically termed micro, pico, or femto cells and create, together with the macro cells, a heterogeneous network (hetnet).

Figure 1:
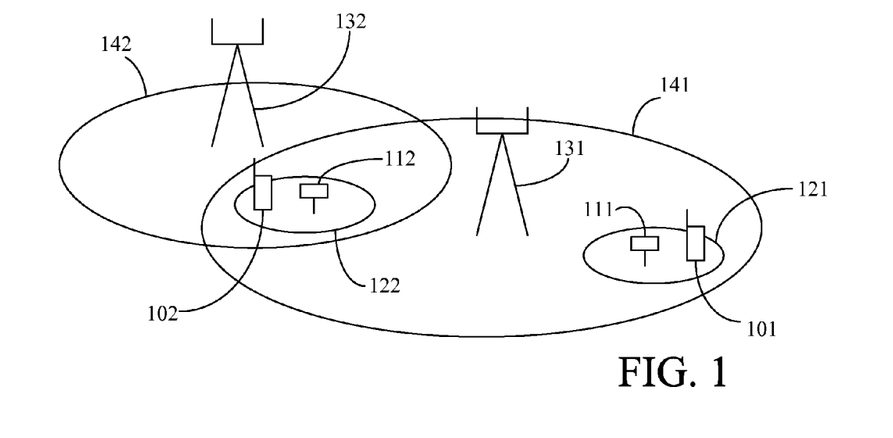
FIG. 1 is a schematic drawing illustrating an example heterogeneous network scenario according to some embodiments.

FIG. 1 schematically illustrates a hetnet deployment with two wide area coverage base station sites 131, 132 serving respective macro cells 141, 142, and two small area coverage nodes 111, 112 serving respective pico cells 121, 122. The coverage areas of base stations and pico nodes typically correspond to an output power used by the respective transmitter. FIG. 1 also illustrates two wireless communication devices (hereinafter also referred to as devices) 101 and 102. The wireless communication device 101 is in the coverage area 141 of the base station 131 and also in the coverage area 121 of the pico node 111. Similarly, the wireless communication device 102 is in the coverage area 141 of the base station 131, in the coverage area 142 of the base station 132 and also in the coverage area 122 of the pico node 112.

If the device 101 is receiving a desired signal from the pico node 111, a signal transmitted from the base station 131 and occupying at least part of the frequency region used to transmit the desired signal may be interfering with the reception of the desired signal. Likewise, if the device 101 is receiving a desired signal from the base station 131, a signal transmitted from the pico node 111 and occupying at least part of the frequency region used to transmit the desired signal may be interfering with the reception of the desired signal.

If the device 102 is receiving a desired signal from the pico node 112, a signal transmitted from the base station 131 (and even more so a signal transmitted from the base station 132) and occupying at least part of the frequency region used to transmit the desired signal may be interfering with the reception of the desired signal. Likewise, if the device 102 is receiving a desired signal from the base station 132, a signal transmitted from the pico node 112 and occupying at least part of the frequency region used to transmit the desired signal may be interfering with the reception of the desired signal.

In a typical hetnet deployment the underlying cells may utilize all—or at least a large part of—the available spectrum resources of the cellular communication system to achieve the requirements (e.g. high peak data rate, high user capacity, etc.), while the macro cells may need to use only a smaller part of the available spectrum resources (e.g. based on frequency reuse) to accommodate its commitments (e.g. coverage, mobility) since the underlying layers offload the macro cells.

Figure 2:
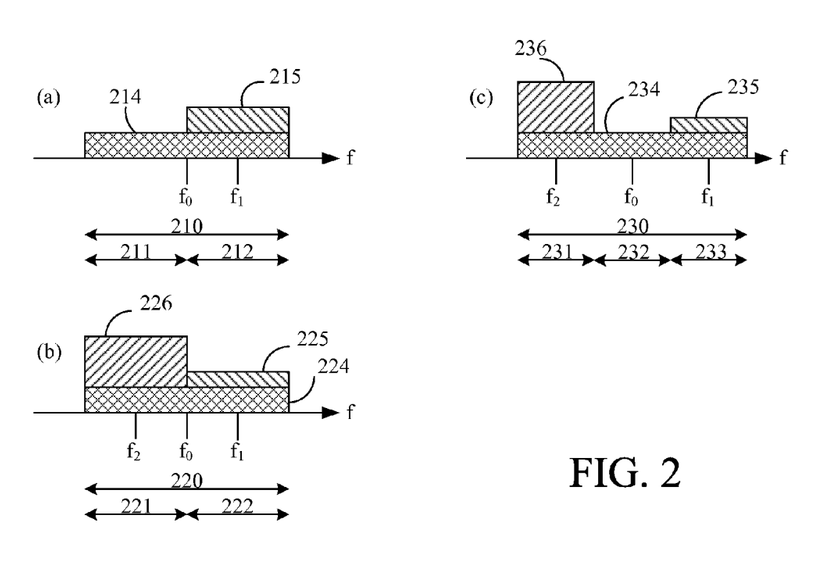
FIG. 2 is a schematic drawing illustrating various example interference situations of a heterogeneous network according to some embodiments.

FIG. 2 schematically illustrates a few example frequency scenarios that may arise in a hetnet deployment.

Part (a) of FIG. 2 illustrates a first situation, where a device (e.g. device 101 of FIG. 1) is receiving a desired signal 214 transmitted from a network node (e.g. pico node 111 of FIG. 1) using carrier frequency $f_0$ and a large signal bandwidth (e.g. 10 MHz) resulting in the frequency region 210. The device also experiences an interfering signal 215 transmitted from another network node (e.g. macro node 131 of FIG. 1) using carrier frequency $f_1$ and a smaller signal bandwidth (e.g. 5 MHz) resulting in the frequency region 212 which is a sub-region of the frequency region 210. No interfering signal is present in the frequency region 211 which is also a sub-region of the frequency region 210.

Part (b) of FIG. 2 illustrates a second situation, where a device (e.g. device 102 of FIG. 1) is receiving a desired signal 224 transmitted from a network node (e.g. pico node 112 of FIG. 1) using carrier frequency $f_0$ and a large signal bandwidth (e.g. 10 MHz) resulting in the frequency region 220. The device also experiences an interfering signal 225 transmitted from another network node (e.g. macro node 131 of FIG. 1) using carrier frequency $f_1$ and a smaller signal bandwidth (e.g. 5 MHz) resulting in the frequency region 222 which is a sub-region of the frequency region 220, and an interfering signal 226 transmitted from yet another network node (e.g. macro node 132 of FIG. 1) using carrier frequency $f_2$ and the smaller signal bandwidth (e.g. 5 MHz) resulting in the frequency region 221 which is also a sub-region of the frequency region 220.

Part (c) of FIG. 2 illustrates a third situation, where a device is receiving a desired signal 234 transmitted from a network node using carrier frequency $f_0$ and a large signal bandwidth (e.g. 15 MHz) resulting in the frequency region 230. The device also experiences an interfering signal 235 transmitted from another network node using carrier frequency $f_1$ and a smaller signal bandwidth (e.g. 5 MHz) resulting in the frequency region 233 which is a sub-region of the frequency region 230, and an interfering signal 236 transmitted from yet another network node using carrier frequency $f_2$ and the smaller signal bandwidth (e.g. 5 MHz) resulting in the frequency region 231 which is also a sub-region of the frequency region 230. No interfering signal is present in the frequency region 232 which is also a sub-region of the frequency region 230.

Thus, due to the use of these multiple layers using more or less overlapping parts of the spectrum and depending on the position of the device, the interference scenario of a device may be very different in different frequency regions of reception. For example, some devices only experience other cell interference in one frequency region of the receiving spectrum (compare with part (a) of FIG. 2), some devices experience other cell interference in all frequency regions of the receiving spectrum, possibly with different power and/or different other characteristics for the respective frequency regions, (compare with part (b) of FIG. 2), some devices experience other cell interference in several—but not all—frequency regions of the receiving spectrum, possibly with different power and/or different other characteristics for the respective frequency regions, (compare with part (c) of FIG. 2) and some devices may not experience any significant interference at all. This type of diversified interference within the same (non-carrier aggregation) reception spectrum is different from typical prior art situations where all pairs of cells heard by a device have completely aligned or completely disjunct signal spectrums and needs to be addressed accordingly.

Situations similar to those illustrated in FIG. 2 may also arise if one or more of the macro cells has an available bandwidth similar to that of the pico nodes, but only schedules part of it.

Similar situations may also arise if one or more of the macro cells have a larger frequency range than the pico cells and the desired signal is transmitted in a macro cell (see e.g. US2012/0003981A1).

The radio access technology used by the different network nodes (e.g. base stations, pico nodes) to transmit desired and interfering signals may be the same radio access technology for all involved network nodes or may differ between the involved network nodes.

For example, network nodes of different layers of a heterogeneous network deployment may use different radio access technology (e.g. UMTS LTE—Universal Mobile Telecommunication Standard, Long Term Evolution—for the pico layer and UMTS HSPA—Universal Mobile Telecommunication Standard, High Speed Packet Access—for the macro layer or WLAN—Wireless Local Area Network, e.g. according to IEEE 802.11—for the pico layer and UMTS LTE for the macro layer).

Further, the different network nodes that create interference in different regions of the receiving spectrum may use the same or different radio access technologies (even if they are not from different layers of a heterogeneous network deployment). For example, one interfering macro node may use UMTS HSPA and another interfering macro node may use UMTS LTE while the pico node may use UMTS LTE or WLAN, or one interfering pico node may use UMTS HSPA and another interfering pico node may use WLAN while an interfered macro node may use UMTS LTE.

All such examples may experience the above-described situation with diversified (varying, differing) interference within the receiving spectrum.

There is a need for scheduling approaches that perform well in situations with diversified interference within the receiving spectrum.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

The inventors have realized that application of traditional scheduling approaches (based on e.g. load distribution) in situations with different interference scenario in different frequency regions of reception may be inferior.

For example, traditional scheduling methods have no possibility to configure remote devices to perform and/or report measurements in a frequency differentiated manner that is suitable for situations with diversified interference within the receiving spectrum.

Some prior art schedulers may perform frequency (and/or time) resource allocation based on reported channel quality indicator values from remote devices. As is well known, the channel quality indicator typically varies with a varying radio channel and there is an inherent delay in the channel quality indicator reporting, which the resource allocation based on channel quality indicator needs to take into account. Hence, a less aggressive modulation and coding scheme is typically used in the resource allocation than the reported channel quality indicator indicates as possible.

In situations as described above with diversified interference within the receiving spectrum, the channel variation may differ substantially between different frequency regions. For example, the channel quality indicator values may be changing much faster in one frequency region (e.g. one with much interference from another cell) than in another frequency region (e.g. one with little or no interference from other cells). Thus, using one channel quality indicator value (and one outer loop link adaptation—OLLA—process) to characterize the entire frequency region of reception is typically not optimal for such situations.

It is an object of some embodiments to obviate at least some of the above disadvantages and to provide interference mitigation approaches that take into account the possibility of diversified interference within the receiving spectrum. Preferably, this is achieved at low complexity and/or low signaling overhead.

According to a first aspect, this is achieved by a method of a first network node of a cellular communication network comprising at least the first network node and a second network node. The first network node is adapted to transmit a first, desired, signal over a first frequency region using a first radio access technology and the second network node is adapted to transmit a second, interfering, signal over a second frequency region using a second radio access technology, wherein the first radio access technology is a single radio frequency carrier radio access technology.

The first frequency region is partitioned into two or more sub-regions and the second frequency region is one of the sub-regions of the first frequency region.

The method comprises determining that a wireless communication device residing in a cell served by the first network node is interfered by the second signal during signal reception over the first frequency region, and sending a first configuration message to the wireless communication device, wherein the first configuration message is adapted to cause the wireless communication device to report separate channel quality indicator values for each of the two or more sub-regions.

The method also comprises receiving a channel quality indicator report indicative of the separate channel quality indicator values for each of the two or more sub-regions from the wireless communication device, and scheduling transmission of the first signal to the wireless communication device in one or more of the two or more sub-regions based on the received channel quality indicator report.

The first frequency region is typically a continuous frequency region.

The channel quality indicator value may be a channel quality indication value CQI value according to UMTS or a channel state indicator (CSI) value according to UMTS LTE.

In some embodiments, the cellular communication network may further comprise a third network node adapted to transmit a third signal over a third frequency region using a third radio access technology. The third frequency region (which may be the same or different than the second frequency region) may be one of the sub-regions of the first frequency region.

According to some embodiments, the cellular communication network may be a heterogeneous network and the first and second network nodes may be comprised in different layers of the heterogeneous network.

In some embodiments, the method may further comprise configuring (for the wireless communication device) one link adaptation process for each of the two or more sub-regions, wherein each of the link adaptation processes uses a respective one of the separate channel quality indicator values. The link adaptation processes may be outer loop link adaptation—OLLA—processes.

Determining that the wireless communication device is interfered by the second signal may, according to some embodiments, comprise sending a second configuration message to the wireless communication device (wherein the second configuration message is adapted to cause the wireless communication device to perform separate channel measurements for each of the two or more sub-regions), receiving a channel measurement report indicative of the separate channel measurements for each of the two or more sub-regions, and determining that the wireless communication device is interfered by the second signal if a discrepancy between a channel measurement for the second frequency region and a channel measurement for another sub-region exceeds a discrepancy threshold.

Alternatively or additionally, determining that the wireless communication device is interfered by the second signal may, according to some embodiments, comprise receiving a geographical position indication of the wireless communication device, and mapping the geographical position indication to an entry of an interference database indicating that the wireless communication device is interfered by the second signal.

Alternatively or additionally, determining that the wireless communication device is interfered by the second signal may, according to some embodiments, comprise receiving a capability indication of the wireless communication device, and determining that the wireless communication device is interfered by the second signal based on the capability indication.

In some embodiments, scheduling transmission of the first signal to the wireless communication device in one or more of the two or more sub-regions based on the received channel quality indicator report may comprise computing a difference between a channel quality indicator value metric for the second frequency region and a channel quality indicator value metric for another sub-region, including the wireless communication device in a first group of devices for scheduling only in the second frequency region if the difference is above a first threshold, including the wireless communication device in a second group of devices for avoiding scheduling in the second frequency region if the difference is below a second threshold, and including the wireless communication device in a third group of devices for scheduling in the first frequency region if the difference is between the first and second thresholds.

In some embodiments, the first, second and third radio access technologies are the same radio access technology. According to some of these embodiments, the first radio access technology is a variable bandwidth radio access technology and the second and third frequency regions are sub-regions of the first frequency region according to the variable bandwidth radio access technology. For example, the partition of the first frequency region into two or more sub-regions may be in accordance with the variable bandwidth system of UMTS LTE (Universal Mobile Telecommunication Standard—Long Term Evolution) of the Third Generation Partnership Project (3GPP).

A signal transmitted by a single radio frequency carrier radio access technology may, for example, be defined as a signal which can (at least theoretically) be down-converted to a baseband signal suitable for demodulation by mixing with a single radio frequency carrier signal. Thus, the first radio access technology is a non-carrier aggregation radio access technology.

A signal transmitted by a single radio frequency carrier radio access technology may carry any suitable signal, for example, an orthogonal frequency division multiplex (OFDM) signal comprising a number of OFDM sub-carriers or a wideband code division multiplex (WCDMA) signal.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is an arrangement for a first network node of a cellular communication network comprising at least the first network node and a second network node. The first network node is adapted to transmit a first, desired, signal over a first frequency region using a first radio access technology and the second network node is adapted to transmit a second, interfering signal over a second frequency region using a second radio access technology, wherein the first radio access technology is a single radio frequency carrier radio access technology.

The first frequency region is partitioned into two or more sub-regions and the second frequency region is one of the sub-regions of the first frequency region.

The arrangement comprises a determiner, a controller, and a scheduler.

The determiner is adapted to determine that a wireless communication device residing in a cell served by the first network node is interfered by the second signal during signal reception over the first frequency region.

The controller is adapted to cause a transmitter to (responsive to the determiner determining that the wireless communication device is interfered by the second signal) send a first configuration message to the wireless communication device, wherein the first configuration message is adapted to cause the wireless communication device to report separate channel quality indicator values for each of the two or more sub-regions.

The scheduler is adapted to schedule transmission of the first signal to the wireless communication device in one or more of the two or more sub-regions based on a received channel quality indicator report indicative of the separate channel quality indicator values for each of the two or more sub-regions from the wireless communication device.

In some embodiments, the arrangement may further comprise the transmitter and a receiver adapted to receive the channel quality indicator report.

The scheduler may, according to some embodiments, be further adapted to (responsive to the determiner determining that the wireless communication device is interfered by the second signal) configure, for the wireless communication device, one link adaptation process for each of the two or more sub-regions, wherein each of the link adaptation processes uses a respective one of the separate channel quality indicator values.

A fourth aspect is an arrangement for a first network node of a cellular communication network comprising at least the first network node and a second network node. The first network node is adapted to transmit a first, desired, signal over a first frequency region using a first radio access technology and the second network node is adapted to transmit a second, interfering signal over a second frequency region using a second radio access technology, wherein the first radio access technology is a single radio frequency carrier radio access technology.

The first frequency region is partitioned into two or more sub-regions and the second frequency region is one of the sub-regions of the first frequency region.

The arrangement comprises a control unit adapted to cause the first network node to determine that a wireless communication device residing in a cell served by the first network node is interfered by the second signal during signal reception over the first frequency region, send a first configuration message to the wireless communication device, wherein the first configuration message is adapted to cause the wireless communication device to report separate channel quality indicator values for each of the two or more sub-regions, receive a channel quality indicator report indicative of the separate channel quality indicator values for each of the two or more sub-regions from the wireless communication device, and schedule transmission of the first signal to the wireless communication device in one or more of the two or more sub-regions based on the received channel quality indicator report.

A fifth aspect is a network node comprising the arrangement according to any of the third and fourth aspect.

In some embodiments, the third and fourth aspects may additionally have features identical with or corresponding to any of the various features as explained above for the first aspect.

An advantage of some embodiments is that they provide scheduling approaches that take into account the possibility of diversified interference within the receiving spectrum.

Another advantage of some embodiments is that they provide improved throughput and/or system capacity.

Yet another advantage of some embodiments is that they have low complexity and/or low signaling overhead (e.g. compared to a brute-force approach where channel quality indicators are reported per sub-carrier of an orthogonal frequency division multiplex—OFDM—system).

BRIEF DESCRIPTION OF THE DRAWINGS

Further objects, features and advantages will appear from the following detailed description of embodiments, with reference being made to the accompanying drawings, in which.

DETAILED DESCRIPTION

As a non-limiting example, it will be assumed in this description that the first, second and third radio access technologies are the same radio access technology, and that the radio access technology is a variable bandwidth radio access technology using a single radio frequency carrier, and it is understood that this includes OFDM transmission. Furthermore, CQI is used as a non-limiting example channel quality indicator.

In the following, embodiments will be described where example scheduling approaches suitable for situations with of diversified interference within the receiving spectrum is provided together with suitable configuration signaling and measurement reporting related thereto. Some embodiments are particularly suitable for use in a heterogeneous network and in other situations where signaling from one or more interfering cells appears in a sub-region of the frequency region of desired signal reception.

In a typical example embodiment, a network node configures a wireless communication device (hereinafter device) served by the network node to report separate CQI values for each frequency region which is a sub-region of the frequency region of desired signal reception and schedule communication with that device based on the reported separate CQI values. For example, communication with the device may be scheduled in sub-regions experiencing low interference (e.g. lower than other sub-regions) or no interference. If the interference level is similar in all of the sub-regions, communication with the device may be scheduled in all sub-regions.

The device may be correspondingly configured to perform measurements (e.g. radio resource management—RRM—measurements, signal quality measurements for CQI, signal-to-interference ratio—SIR—measurements, reference signal received power—RSRP—measurements, reference signal received quality—RSRQ—measurements, received signal strength indication—RSSI—measurements, etc.) per frequency sub-region.

In some embodiments, the network node configures all devices served by it to report separate CQI values (e.g. if it knows that the whole cell coverage area is at risk of being interfered by another cell on a frequency sub-region of its communication spectrum).

Alternatively or additionally, in some embodiments, the network node configures a device to report separate CQI values if the device reports that it has interference mitigation capabilities that comprise applying different interference mitigation to different frequency sub-regions of the reception frequency region.

Yet alternatively or additionally, in some embodiments, the network node configures a device to report separate CQI values if an interference report (or channel estimation report) from the device indicates that the device experiences different interference in different frequency sub-regions of the reception frequency region. Performance of related measurements by the device may be configured by the network node.

Even yet alternatively or additionally, in some embodiments, the network node configures a device to report separate CQI values if a geographical position of the device indicates that the device is in a location where it may experience different interference in different frequency sub-regions of the reception frequency region.

In addition to configuring the device to send separate CQI reports for separate frequency sub-regions of the reception frequency region (and perform related measurements) the network node may configure one outer loop link adaptation (OLLA) process to be used per sub-region.

The outer loop link adaptation may, typically, be used to compensate for possible errors between a channel quality corresponding to a reported CQI value and an actual channel quality. Such errors may be detectable, for example, in terms of an amount of erroneously decoded transmission blocks (e.g. presented as a percentage of NACK messages reported in a corresponding HARQ process). CQI reporting may typically be adapted to provide operation at a (first transmission) block error rate (BLER) of approximately 10-30%, but the exact mapping between reported CQI values and modulation and coding scheme use may vary (e.g. due to variations in the channel and/or in the interference situation). Application of one OLLA process per sub-region provides for adaption in view of such variations in the mapping due to different interference scenarios in different sub-regions.

Figure 3:
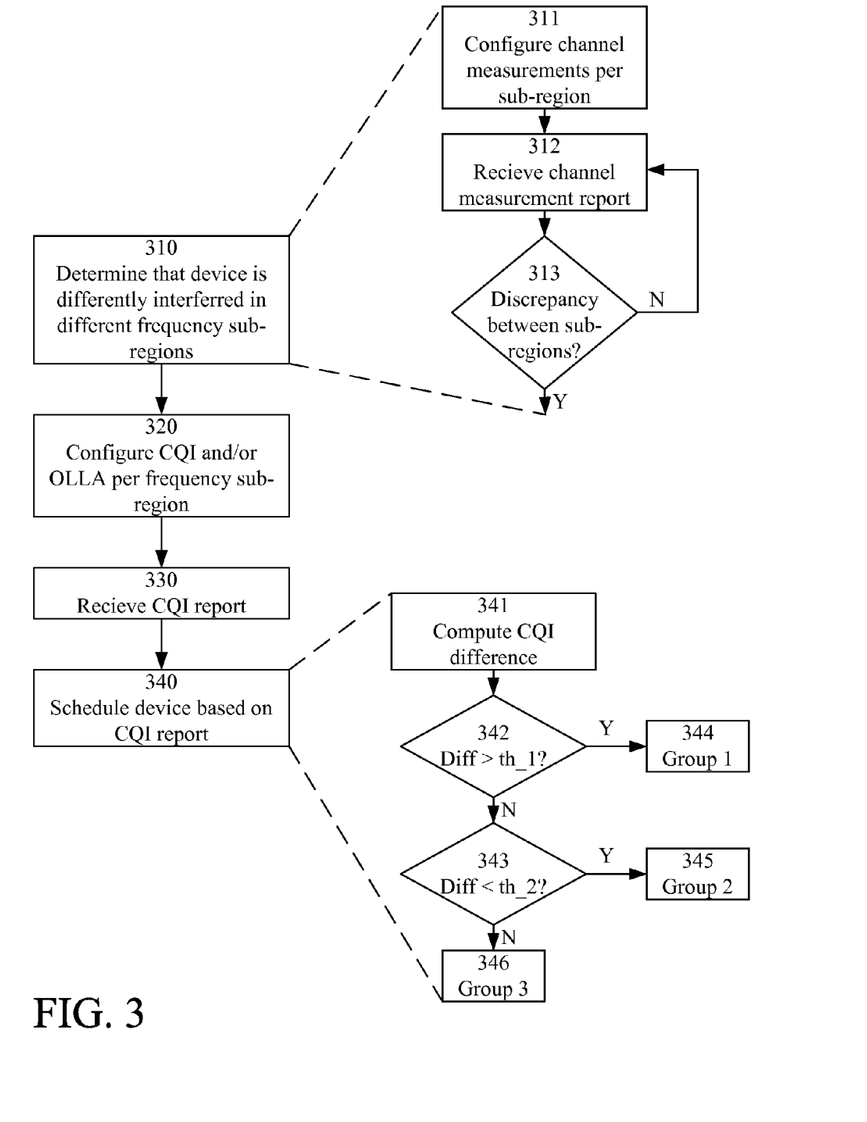
FIG. 3 is a flowchart illustrating example method steps according to some embodiments.

FIG. 3 illustrate an example method according to some embodiments for adaptive scheduling in situations with different interference situations in different frequency sub-regions of a receiving spectrum.

The method may, for example, be performed by a wireless communication network node of a cellular communication network using a variable bandwidth single radio frequency carrier radio access technology.

The method starts in step 310 where it is determined that the device is differently interfered in different frequency sub-regions of the receiving spectrum.

One example implementation of step 310 is illustrated by way of sub-steps 311, 312, 313. In sub-step 311 the network node configures the device to perform separate channel measurements per sub-region, for example, by sending a corresponding configuration message to the device. A corresponding channel measurement report indicative of the separate channel measurements is received from the device in sub-step 312, and the network node determines (in sub-step 313) whether or not the device is differently interfered in different frequency sub-regions. For example, it may be determined that the device is differently interfered in different frequency sub-regions (Y-path out from sub-step 313) if a discrepancy between the channel measurements for the different sub-regions is detected (e.g. if a difference between the channel measurements exceeds a discrepancy threshold). If it is determined that the device is not differently interfered in different frequency sub-regions (N-path out from sub-step 313, e.g. if the difference between the channel measurements does not exceed the discrepancy threshold) the method returns to sub-step 312 and continues to monitor the interference situation. Otherwise it continues to step 320.

In some embodiments, step 310 may be combined with or substituted by one or more other approaches to determining that the device is interfered during signal reception by another cell in a frequency sub-region of the reception frequency region.

For example, the network node may receive (e.g. either from the device itself) a geographical position indication of the device and mapping the geographical position indication to an entry of an interference database indicating that the device is interfered differently in different sub-regions.

In some embodiments, the network node determines that all devices in a cell served by the network node are interfered differently in different sub-regions (e.g. if that entire cell is within a coverage area of another cell).

In some embodiments, the network node exchanges information (e.g. cell ID; system bandwidth, transmission bandwidth, radio frequency carrier, etc.) with neighboring nodes that enable it to determine whether or not a device is differently interfered in different frequency sub-regions.

In some embodiments, the network node receives a capability indication of the wireless communication device and uses that capability to determine which devices may be interfered differently in different sub-regions. For example, a device capable of reporting separate CQI values for different sub-regions and/or capable of using different interference mitigation approaches in different sub-regions typically employs a reception region that may be differently interfered in different sub-regions. The network node may use this as its only determination (e.g. if the entire cell suffer from interference from a neighboring cell) or may combine it with e.g. geographical positions and/or measurement reports as described above. Typically, the network node may only configure devices capable of reporting separate CQI values for different sub-regions to do so.

When it has been determined in step 310 that the device is (or is at risk of being) interfered during signal reception by another cell in a frequency sub-region of the reception frequency region, the method continues to step 320 where the network node configures separate CQI values to be reported for each of the sub-regions by sending a corresponding configuration message (not to be confused with that of sub-step 311) to the device. The corresponding CQI report(s) are received in step 330. The CQI per sub-region (as well as the measurements of sub-step 312) may be configured to be reported periodically or a-periodically, and in some embodiments reporting may be circulating over the involved sub-regions. The CQI per sub-region may complement or replace an overall CQI value and/or a CQI value per sub-carrier set of an OFDM system.

In some embodiments, a separate OLLA process is also configured per frequency sub-region in step 320 and the respective CQI values of the report(s) of step 330 may be used in the respective OLLA process. For example, one collective OLLA process may be configured for sub-regions having similar interference levels (e.g. determined by comparing difference between SIR values or other suitable metrics to a threshold) and different OLLA processes may be configured for sub-regions having (sufficiently) different interference levels.

Finally, in step 340, the network node uses the respective CQI values of the report(s) of step 330 to schedule communication (e.g. transmission) with the device. Typically, communication with the device may be scheduled in one or more frequency sub-regions with corresponding CQI value(s) that indicate low interference compared to one or more other sub-regions.

One example implementation of step 340 is illustrated by sub-steps 341-346. In sub-step 341, a difference between CQI values (or related metrics derived there from) of two sub-regions is computed. For example, one term of the difference computation may be the CQI value indicating highest interference among the sub-regions.

If the difference is larger than a first threshold, th_1 (Y-path out from sub-step 342), the device belongs to a first group (Group 1) as illustrated in sub-step 344 and is scheduled in the sub-region that has the lowest interference among the sub-regions of the difference computation.

If the difference is smaller than a second threshold, th_2, which is smaller than the first threshold (Y-path out from sub-step 343), the device belongs to a second group (Group 2) as illustrated in sub-step 345 and is scheduled in the sub-region that has the lowest interference among the sub-regions of the difference computation (the other sub-region compared to sub-step 344).

If the difference is between the first and second thresholds (N-paths out from sub-steps 342 and 343), the device belongs to a third group (Group 3) as illustrated in sub-step 346 and is scheduled in both sub-regions of the difference computation (or none of them if a sub-region with lower interference is found in another difference computation).

In some embodiments, communication with the devices of groups 1 and 2 may be scheduled in both sub-regions but with different link adaptation settings.

The thresholds and the inequalities in sub-steps 342 and 343 may, of course, be adapted based on the metric used.

Figure 4:
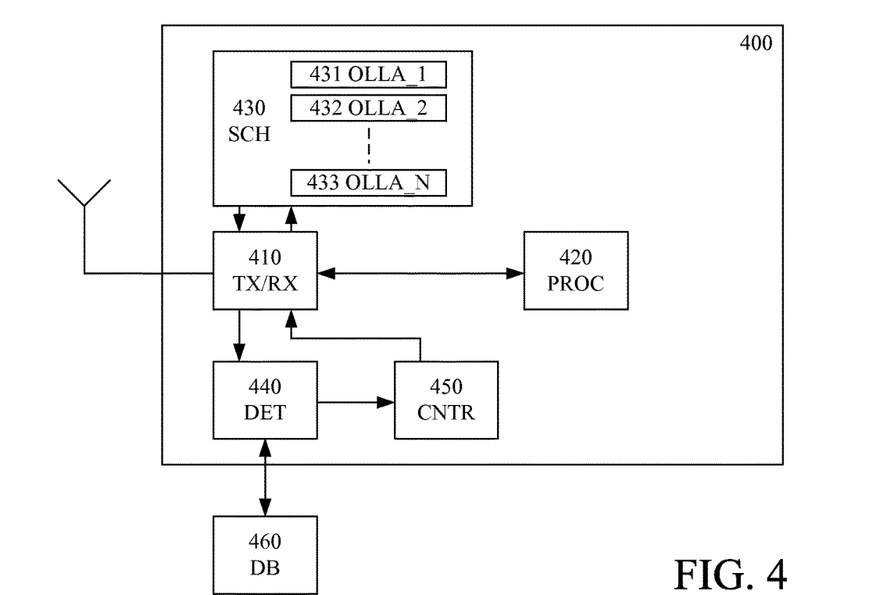
FIG. 4 is a block diagram illustrating an example arrangement according to some embodiments.

FIG. 4 schematically illustrate an example arrangement 400 according to some embodiments for scheduling in situations with different interference situations in different frequency sub-regions of a receiving spectrum. The example arrangement 400 may, for example be comprised in a wireless communication network node and/or may be adapted to perform the method according to FIG. 3.

The example arrangement 400 comprises a transceiver (TX/RX) 410, a determiner (DET) 440, a controller (CNTR) 450, and a scheduler (430).

The arrangement 400 may also comprise other processing units or components (PROC) 420 for processing of received signals and signals intended for transmission according to any suitable known of future implementations.

The transceiver 410 is adapted to transmit and received various signals to and from a device residing in a cell served by the network node comprising the arrangement 400.

The determiner 440 is adapted to determine whether or not the device is interfered differently in different sub-regions of a reception frequency region (compare with step 310 of FIG. 3 and the related text). Typically the determination may be based on signals received by the transceiver 410.

The controller 450 is adapted to cause the transceiver 410 to send (based on determinations of the determiner 440) a configuration message to the device to configure the device to report separate CQI values for each sub-region (compare with step 320 of FIG. 3 and corresponding text). The transceiver 410 is adapted to receive the corresponding CQI report(s) from the device (compare with step 330 of FIG. 3 and corresponding text).

The scheduler 430 is adapted to schedule communication with the device in one or more sub-regions based the received CQI (compare with step 340 of FIG. 3 and corresponding text). In some embodiments, the scheduler 430 may be adapted to configure one OLLA process (OLLA_1, OLLA_2, OLLA_N) 431, 432, 433 for each sub-region of a device as has been explained above.

In some embodiments, the determiner 440 is adapted to determine whether or not the device is differently interfered in different sub-regions based on a geographical position indication of the device (e.g. received from the device by the transceiver 410). In these embodiments, the determiner 440 may be adapted to map the geographical position indication to an entry of an interference database (DB) 460, wherein the entries of the database indicates whether or not the geographical position is one where different interference in different sub-regions may be experienced. The database 460 may reside in the network node (comprised in the arrangement 400 or not), elsewhere in the communication network, in a cloud-based service (e.g. the Internet), or in any other suitable location.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication network node (e.g. macro, micro, pico, femto, etc.)) comprising circuitry/logic or performing methods according to any of the embodiments. The electronic apparatus may, for example, be an access node or a base station.

For example, a wireless communication network node may comprise an arrangement according to FIG. 4 and/or an arrangement comprising a control unit adapted to cause the wireless communication network node to perform the method according to FIG. 3.

Figure 5:
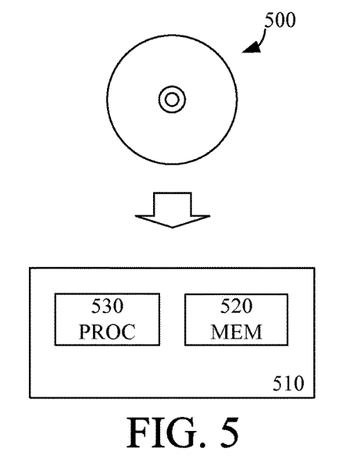
FIG. 5 is a schematic drawing illustrating an example computer program product according to some embodiments.

According to some embodiments, a computer program product comprises a computer readable medium such as, for example, a diskette or a CD-ROM as illustrated by the example CD-ROM 500 of FIG. 5. The computer readable medium may have stored thereon a computer program comprising program instructions. The computer program may be loadable into a data-processing unit 530, which may, for example, be comprised in a network node 510. When loaded into the data-processing unit, the computer program may be stored in a memory 520 associated with or integral to the data-processing unit 530. According to some embodiments, the computer program may, when loaded into and run by the data-processing unit, cause the data-processing unit to execute method steps according to, for example, the method shown in FIG. 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a first network node of a cellular communication network comprising at least the first network node and a second network node, wherein the first network node is adapted to transmit a first signal over a first frequency region using a first radio access technology, the second network node is adapted to transmit a second signal over a second frequency region using a second radio access technology, the first radio access technology is a single radio frequency carrier radio access technology, the first frequency region is partitioned into two or more sub-regions, the second frequency region is one of the sub-regions of the first frequency region, the first signal is a desired signal and the second signal is an interfering signal, the method comprising:

determining that a wireless communication device residing in a cell served by the first network node is interfered by the second signal during signal reception over the first frequency region; wherein the determination comprises:
  receiving a capability indication of the wireless communication device;
  determining that the wireless communication device is interfered by the second signal based on the capability indication;
sending a first configuration message to the wireless communication device, wherein the first configuration message is adapted to cause the wireless communication device to report separate channel quality indicator values for each of the two or more sub-regions;
receiving a channel quality indicator report indicative of the separate channel quality indicator values for each of the two or more sub-regions from the wireless communication device; and
scheduling transmission of the first signal to the wireless communication device in one or more of the two or more sub-regions based on the received channel quality indicator report.

2. The method of claim 1, wherein the cellular communication network is a heterogeneous network and wherein the first and second network nodes are comprised in different layers of the heterogeneous network.

3. The method of claim 1, further comprising configuring, for the wireless communication device, one link adaptation process for each of the two or more sub-regions, wherein each of the link adaptation processes uses a respective one of the separate channel quality indicator values.

4. The method of claim 1, wherein determining that the wireless communication device is interfered by the second signal comprises:
  sending a second configuration message to the wireless communication device, wherein the second configuration message is adapted to cause the wireless communication device to perform separate channel measurements for each of the two or more sub-regions;
  receiving a channel measurement report indicative of the separate channel measurements for each of the two or more sub-regions; and
  determining that the wireless communication device is interfered by the second signal if a discrepancy between a channel measurement for the second frequency region and a channel measurement for another sub-region exceeds a discrepancy threshold.

5. The method of claim 1, wherein determining that the wireless communication device is interfered by the second signal comprises:
  receiving a geographical position indication of the wireless communication device; and
  mapping the geographical position indication to an entry of an interference database indicating that the wireless communication device is interfered by the second signal.

6. The method of claim 1, wherein scheduling transmission of the first signal to the wireless communication device in one or more of the two or more sub-regions based on the received channel quality indicator report comprises:
  computing a difference between a channel quality indicator value metric for the second frequency region and a channel quality indicator value metric for another sub-region;
  including the wireless communication device in a first group of devices for scheduling only in the second frequency region if the difference is above a first threshold;
  including the wireless communication device in a second group of devices for avoiding scheduling in the second frequency region if the difference is below a second threshold; and
  including the wireless communication device in a third group of devices for scheduling in the first frequency region if the difference is between the first and second thresholds.

7. A nontransitory computer readable storage medium, having thereon a computer program comprising program instructions, the computer program being loadable into a data-processing unit and adapted to cause execution of a method when the computer program is run by the data-processing unit, wherein the method is a method of a first network node of a cellular communication network comprising at least the first network node and a second network node, wherein the first network node is adapted to transmit a first signal over a first frequency region using a first radio access technology, the second network node is adapted to transmit a second signal over a second frequency region using a second radio access technology, the first radio access technology is a single radio frequency carrier radio access technology, the first frequency region is partitioned into two or more sub-regions, the second frequency region is one of the sub-regions of the first frequency region, the first signal is a desired signal and the second signal is an interfering signal, and the method comprises:
  determining that a wireless communication device residing in a cell served by the first network node is interfered by the second signal during signal reception over the first frequency region; wherein the determination comprises:
    receiving a capability indication of the wireless communication device;
    determining that the wireless communication device is interfered by the second signal based on the capability indication;
  sending a first configuration message to the wireless communication device, wherein the first configuration message is adapted to cause the wireless communication device to report separate channel quality indicator values for each of the two or more sub-regions;
  receiving a channel quality indicator report indicative of the separate channel quality indicator values for each of the two or more sub-regions from the wireless communication device; and
  scheduling transmission of the first signal to the wireless communication device in one or more of the two or more sub-regions based on the received channel quality indicator report.

8. A network node of a cellular communication network comprising at least the first network node and a second network node, wherein the first network node is adapted to transmit a first signal over a first frequency region using a first radio access technology, the second network node is adapted to transmit a second signal over a second frequency region using a second radio access technology, the first radio access technology is a single radio frequency carrier radio access technology, the first frequency region is partitioned into two or more sub-regions, the second frequency region is one of the sub-regions of the first frequency region, the first signal is a desired signal and the second signal is an interfering signal, the network node comprising:

a determiner adapted to determine that a wireless communication device residing in a cell served by the network node is interfered by the second signal during signal reception over the first frequency region: wherein the determination comprises:
receiving a capability indication of the wireless communication device:
determining that the wireless communication device is interfered by the second signal based on the capability indication;
a controller adapted to cause a transmitter to, responsive to the determiner determining that the wireless communication device is interfered by the second signal, send a first configuration message to the wireless communication device, wherein the first configuration message is adapted to cause the wireless communication device to report separate channel quality indicator values for each of the two or more sub-regions; and
a scheduler adapted to schedule transmission of the first signal to the wireless communication device in one or more of the two or more sub-regions based on a received channel quality indicator report indicative of the separate channel quality indicator values for each of the two or more sub-regions from the wireless communication device.

9. The network node of claim 8, further comprising the transmitter and a receiver adapted to receive the channel quality indicator report.

10. The network node of claim 8, wherein the scheduler is further adapted to, responsive to the determiner determining that the wireless communication device is interfered by the second signal, configure, for the wireless communication device, one link adaptation process for each of the two or more sub-regions, wherein each of the link adaptation processes uses a respective one of the separate channel quality indicator values.

11. The network node of claim 8, wherein:
the controller is further adapted to cause the transmitter to send a second configuration message to the wireless communication device, wherein the second configuration message is adapted to cause the wireless communication device to perform separate channel measurements for each of the two or more sub-regions; and
the determiner is adapted to determine that the wireless communication device is interfered by the second signal if a discrepancy between a channel measurement for the second frequency region and a channel measurement for another sub-region exceeds a discrepancy threshold, wherein the channel measurement for the second frequency region and the channel measurement for the another sub-region are indicated by a received channel measurement report indicative of the separate channel measurements for each of the two or more sub-regions.

12. The network node of claim 8, wherein the determiner is adapted to determine that the wireless communication device is interfered by the second signal if a received geographical position indication of the wireless communication device is mapped to an entry of an interference database indicating that the wireless communication device is interfered by the second signal.

13. The network node of claim 8, wherein the scheduler is adapted to schedule transmission of the first signal to the wireless communication device in one or more of the two or more sub-regions based on the received channel quality indicator report by:
computing a difference between a channel quality indicator value metric for the second frequency region and a channel quality indicator value metric for another sub-region;
including the wireless communication device in a first group of devices for scheduling only in the second frequency region if the difference is above a first threshold;
including the wireless communication device in a second group of devices for avoiding scheduling in the second frequency region if the difference is below a second threshold; and
including the wireless communication device in a third group of devices for scheduling in the first frequency region if the difference is between the first and second thresholds.

* * * * *